(12) United States Patent
Kishida et al.

(10) Patent No.: US 10,718,677 B2
(45) Date of Patent: Jul. 21, 2020

(54) PRESSURE SENSOR WITH REDUCED DEVIATION OF TEMPERATURE DISTRIBUTION

(71) Applicant: HORIBA STEC, Co., Ltd., Kyoto-shi, Kyoto (JP)

(72) Inventors: Sotaro Kishida, Kyoto (JP); Junya Nakai, Kyoto (JP); Takehisa Hataita, Kyoto (JP); Akira Kuwahara, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 247 days.

(21) Appl. No.: 15/938,163

(22) Filed: Mar. 28, 2018

(65) Prior Publication Data

US 2018/0283971 A1    Oct. 4, 2018

(30) Foreign Application Priority Data

Mar. 29, 2017 (JP) ................. 2017-065340

(51) Int. Cl.
*G01L 9/00* (2006.01)
*G01L 19/14* (2006.01)
*G01L 19/06* (2006.01)

(52) U.S. Cl.
CPC ........ *G01L 9/0072* (2013.01); *G01L 19/0627* (2013.01); *G01L 19/147* (2013.01)

(58) Field of Classification Search
CPC ......... G01L 9/0072; G01L 9/12; G01L 9/025; G01L 9/0005; G01L 9/0008; G01L 9/0002; G01L 9/0001; G01L 9/0051; G01L 9/00; G01L 9/0042; G01L 19/14; G01L 19/0627; G01L 19/147; G01L 19/0061; G01L 7/00;

(Continued)

(56) References Cited

U.S. PATENT DOCUMENTS 4,314,225 A * 2/1982 Tominaga ........... G01L 19/0084
228/262.9
5,808,206 A * 9/1998 Pandorf ................ G01L 9/0072
73/756

(Continued)

FOREIGN PATENT DOCUMENTS

JP    2015148579 A    8/2015

*Primary Examiner* — Harshad R Patel
*Assistant Examiner* — Nigel H Plumb
(74) *Attorney, Agent, or Firm* — Alleman Hall Creasman & Tuttle LLP

(57) ABSTRACT

The pressure sensor comprises the diaphragm, an electrode body, a housing, an inlet pipe, and a thermal buffer member. The diaphragm includes a pressure receiving surface configured to receive a pressure of a measured target fluid. The electrode body includes an electrode surface facing a rear surface of the pressure receiving surface with a gap interposed therebetween. The housing supports the diaphragm so as to form a measuring chamber by surrounding the pressure receiving surface. The inlet pipe is coupled to the housing and configured to guide the measured target fluid into the measuring chamber. The thermal buffer member is disposed on the inlet pipe and has a predetermined heat capacity. Accordingly, the diaphragm is unlikely to bend due to a rapid temperature change in a fluid guiding pipe disposed a fluid line.

7 Claims, 4 Drawing Sheets

(58) Field of Classification Search
CPC ... G01L 7/02; G01L 7/088; G01L 7/08; G01L 21/00; G01L 1/10; G01N 25/00
See application file for complete search history.

(56) References Cited

U.S. PATENT DOCUMENTS

| | | | | |
|---|---|---|---|---|
| 8,763,467 | B2* | 7/2014 | Ishihara | G01L 9/0072 |
| | | | | 73/708 |
| 9,184,364 | B2* | 11/2015 | Chakraborty | H01L 35/30 |
| 9,631,985 | B2* | 4/2017 | Herman | G01K 13/028 |
| 2002/0100333 | A1* | 8/2002 | Gravel | G01L 9/0075 |
| | | | | 73/756 |
| 2009/0241678 | A1* | 10/2009 | Motoyama | G01L 9/0033 |
| | | | | 73/717 |
| 2016/0103030 | A1* | 4/2016 | Kishida | G01L 9/0042 |
| | | | | 73/724 |
| 2016/0169759 | A1* | 6/2016 | Kishida | G01L 9/0072 |
| | | | | 73/724 |
| 2018/0238757 | A1* | 8/2018 | Soeda | G01L 9/0072 |

\* cited by examiner

PRESSURE SENSOR WITH REDUCED DEVIATION OF TEMPERATURE DISTRIBUTION

CROSS-REFERENCE TO RELATED APPLICATIONS

This application claims priority on Japanese Patent Application No. 2017-065340 filed on Mar. 29, 2017, the disclosure of which is incorporated by reference herein.

BACKGROUND

Field

The present invention relates to a pressure sensor for measuring a fluid pressure on the basis of a change in electrostatic capacity between a diaphragm that deforms under pressure and an electrode body.

Description of the Related Art

A pressure sensor has conventionally been used for measuring a pressure in a vacuum state during a thin film formation process in a semiconductor manufacturing step or the like. Examples of this type of pressure sensor include one which includes a housing 11 with an inlet part 10A for a measured target fluid, a diaphragm 32 that bends under a pressure of the measured target fluid guided through the inlet part 10A of the housing 11, and a sensor chip 30 that derives a change in the diaphragm 32 as a change in electrostatic capacity, as illustrated in, for example, Patent document 1 and FIG. 4. By coupling a fluid guiding pipe disposed in a fluid line of a semiconductor manufacturing apparatus to the inlet part 10A of the housing 11, the measured target fluid, such as gas, passing through the fluid line is taken into the inside of the housing 11. With this pressure sensor, the same material as a thin film of a process object and any by-product thereof (hereinafter referred to as contaminant) may attach to the diaphragm during use. The diaphragm may be subjected to bending under stress due to the attached contaminant, thus causing a shift of an output signal of the sensor. In order to prevent the contaminant from attaching to the diaphragm or the like, it has therefore been known to maintain the housing 11 at a temperature high enough to prevent deposition of the contaminant by heating a sensor case 80 surrounding the housing 11 by a heater 90, as described in, for example, JP2015-148579A.

With the above pressure sensor, a fluid guiding pipe for guiding the measured target fluid into the pressure sensor is coupled to the housing, and the fluid guiding pipe is heated by the heater in order to prevent a fluid, such as gas, from adhering to the fluid guiding pipe during use. It is thus possible to prevent the gas from adhering to the fluid guiding pipe by heating the fluid guiding pipe.

However, when the fluid guiding pipe is heated by the heater, the heat thereof is transferred to a lower part of the housing for the pressure sensor, and a rapid temperature increase occurs in the lower part of the housing. Accordingly, the lower part of the housing is subjected to rapid thermal expansion. In contrast, even when the fluid guiding pipe is rapidly heated by the heater, the heat thereof is transferred inside the housing, in an upper part of the housing being separated from the fluid guiding pipe. Consequently, the temperature in the upper part of the housing does not increase rapidly but increases moderately, and the resulting thermal expansion in the upper part of the housing becomes smaller than the thermal expansion in the lower part of the housing. This leads to a difference in thermal expansion between the upper and lower parts of the housing. Due to the thermal expansion, the lower part of the housing is subjected to a stress expanding in an outward direction, namely, in a direction from an approximately center of the diaphragm toward a circumference in a plane direction of the diaphragm. On the other hand, the upper part of the housing is subjected to a stress to restore inwards, namely, in a direction from the circumference of the diaphragm toward the approximately center in the plane direction of the diaphragm. Consequently, the diaphragm supported (or joined) to the upper part of the housing may be subjected to bending, thereby lowering reliability of a measured pressure to be outputted from the pressure sensor.

SUMMARY

Problems to be Solved

The present invention has been made to solve the above problem, and aims at providing a pressure sensor configured to ensure that a diaphragm is less likely to bend due to a rapid temperature change in a fluid guiding pipe disposed in a fluid line (hereinafter also referred to as "piping thermal influence").

Means for Solving the Problems

In one aspect, the present invention provides a pressure sensor including a diaphragm, an electrode body, a housing, an inlet pipe, and a thermal buffer member. The diaphragm includes a pressure receiving surface configured to receive a pressure of a measured target fluid. The electrode body includes an electrode surface facing a rear surface of the pressure receiving surface with a gap interposed therebetween. The housing supports the diaphragm so as to form a measuring chamber by surrounding the pressure receiving surface. The inlet pipe is coupled to the housing and configured to guide the measured target fluid into the measuring chamber. The thermal buffer member is disposed on the inlet pipe and has a predetermined heat capacity.

In the above pressure sensor, the thermal buffer member having the predetermined heat capacity is attached to the inlet pipe. Therefore, even when the fluid guiding pipe is rapidly heated by a heater, part of the heat thereof is consumed to increase a temperature of the thermal buffer member disposed on the inlet pipe. Hence, a temperature of the inlet pipe and a temperature of a lower part of the housing coupled to the inlet pipe increase moderately without a rapid increase. During the time that the temperature of the inlet pipe and the temperature of the lower part of the housing increase moderately for a long time, the heat from the fluid guiding pipe is transferred inside the housing, thus increasing the temperature of the upper part of the housing to which the diaphragm is coupled. Because the thermal buffer member having the predetermined heat capacity is disposed on the inlet pipe, even when the fluid guiding pipe is rapidly heated by the heater, the temperature of the whole housing can be increased moderately while preventing only the lower part of the housing from being subjected to the rapid temperature increase. In other words, by disposing the thermal buffer member on the inlet pipe, the thermal buffer member functions as a temperature control mechanism, thereby reducing deviation of temperature distribution within the housing during heating of the fluid guiding pipe. It is therefore possible to reduce a difference in thermal expansion between the upper part of the housing, which supports the diaphragm, and the lower part of the housing, thus ensuring that the diaphragm is less likely to bend.

In the present specification, the term "having a predetermined heat capacity" denotes a heat capacity to such a degree that even when the fluid guiding pipe is rapidly heated, the bending of the diaphragm due to the difference in thermal expansion between the upper and lower parts of the housing can be held within an allowable range by preventing a rapid temperature increase in the lower part of the housing, and thereby reducing the deviation of the temperature distribution within the housing.

The pressure sensor preferably further includes a shell and a heater configured to heat the shell. The shell surrounds a part or whole of the housing and the diaphragm with a space interposed therebetween. The thermal buffer member is preferably thermally coupled to the shell.

In the above pressure sensor, because the space exists between the shell and the housing, heat radiated from the shell heated by the heater diffuses within the space. Therefore, the temperature of the whole housing can be increased more uniformly, namely, with less deviation of temperature distribution, consequently further reducing bending of the diagram due to a difference in thermal expansion. Moreover, because the thermal buffer member is thermally coupled to the shell, the heat from the heated fluid guiding pipe can be transferred through the thermal buffer member to the shell. In other words, a heat capacity transferred from the fluid guiding pipe to the housing can be further reduced to ensure that a rapid temperature change is much less likely to occur in the lower part of the housing. Furthermore, the heat transferred from the thermal buffer member to the shell is transferred to the housing by being diffused over space inside the shell. It is therefore possible to more uniformly increase the temperature of the whole housing. Consequently, the temperature of the whole housing can be increased more uniformly, namely, with less deviation of temperature distribution, thereby further reducing the bending of the diaphragm due to the difference in thermal expansion between the upper and lower parts of the housing.

In the present specification, the phrase that "the thermal buffer member is thermally coupled to the shell" denotes being designed so that heat is directly or indirectly transferred between the thermal buffer member and the shell. The phrase that "heat is indirectly transferred" denotes that another heat transfer member may be interposed between the thermal buffer member and the shell. This is also true for "thermal connection" between other members.

The thermal buffer member is preferably in contact with an outer surface of the shell.

In the above pressure sensor, no thermal buffer member exists between the shell and the housing, so that the heat radiated from the shell is further diffused inside the space. Therefore, the temperature of the whole housing can be more uniformed increased, thereby further reducing the bending of the diaphragm due to the difference in thermal expansion.

The thermal buffer member is preferably disposed on an outer circumferential surface of the inlet pipe.

In the above pressure sensor, because the thermal buffer member is disposed so as to surround a circumferential direction of the inlet pipe, the heat transferred from the heated fluid guiding pipe can be more uniformly transferred to the thermal buffer member in the circumferential direction of the inlet pipe. It is therefore possible to further reduce the deviation of temperature distribution in the circumferential direction in the housing to which the inlet pipe is coupled, thereby further reducing the bending of the diaphragm due to the difference in thermal expansion.

In the specification, the phrase "being attached to the outer circumferential surface of the inlet pipe" denotes being contactedly attached to the inlet pipe while surrounding the outer surface of the inlet pipe in the circumferential direction.

The thermal buffer member is preferably integrally formed with the inlet pipe.

In the above pressure sensor, a process of joining the thermal buffer member and the inlet pipe together by welding is omittable when manufacturing the pressure sensor, thus leading to enhanced productivity.

The thermal buffer member preferably has a disk shape and is disposed so that an axial line of the thermal buffer member coincides with an axial line of the inlet pipe.

In the above pressure sensor, the heat from the heated fluid guiding pipe can be more uniformly transferred to the thermal buffer member in the circumferential direction of the inlet pipe. This makes it possible to further reduce the deviation of the temperature distribution in the circumferential direction in the housing to which the inlet pipe is coupled, thereby further reducing the bending of the diaphragm due to the difference in thermal expansion.

In the present specification, the term "axial line" denotes a line which passes through a circle center of a circular cross section of a member whose cross section has a circular shape, and which is perpendicular to the circular cross section. The phrase that "the thermal buffer member is disposed so that an axial line of the thermal buffer member coincides with an axial line of the inlet pipe" denotes that the thermal buffer member is attached to the inlet pipe so as to form a concentric circular shape in cross section relative to the inlet pipe whose cross section has a circular shape.

The housing preferably includes a side wall and a bottom wall, and the side wall and the bottom wall together with the diaphragm are configured to form the measuring chamber. The side wall has a thin wall part having a smaller thickness than other parts of the side wall and surrounding the measuring chamber.

In the above pressure sensor, because the thin wall part having low rigidity is disposed at the part of the housing, even when there occurs a stress extending outside the housing due to thermal expansion in the lower part of the housing, the thin wall part bends and deforms, resulting in a reduced stress to restore inwards in the upper part of the housing. It is consequently possible to further reduce the bending of the diaphragm due to the difference in thermal expansion between the upper and lower parts of the housing.

In another aspect, the present invention provides a pressure sensor including a diaphragm, an electrode body, a housing, and an inlet pipe. The diaphragm includes a pressure receiving surface configured to receive a pressure of a measured target fluid. The electrode body includes an electrode surface facing a rear surface of the pressure receiving surface with a gap interposed therebetween. The housing supports the diaphragm so as to form a measuring chamber by surrounding the pressure receiving surface. The inlet pipe is coupled to the housing and configured to guide the measured target fluid into the measuring chamber. The housing includes a side wall and a bottom wall. A wall thickness of a part or whole of the bottom wall is greater than a wall thickness of the side wall.

In the above pressure sensor, it is possible to increase a heat capacity of the bottom wall of the housing to which the inlet pipe is coupled. Therefore, even when the fluid guiding pipe is rapidly heated by the heater, the heat thereof is firstly consumed to increase the temperature of the bottom wall of the housing, so that a temperature of the side wall in the lower part of the housing increases moderately without a rapid increase. During the time that the temperature of the side wall in the lower part of the housing increases moderately for a long time, the heat from the fluid guiding pipe is transferred inside the housing, thus leading to an increase in temperature of the side wall in the upper part of the housing to which the diaphragm is coupled. Thus, by increasing the heat capacity of the bottom wall of the housing, even when the fluid guiding pipe is rapidly heated by the heater, the temperature of the whole side wall of the housing can increase moderately while preventing only the side wall in the lower part of the housing from being subjected to a rapid temperature increase. In other words, by making the wall thickness of a part or whole of the bottom wall greater than the wall thickness of the side wall, namely, by increasing the heat capacity of the bottom wall, the bottom wall of the housing functions as a temperature control mechanism, thereby reducing the deviation of the temperature distribution within the housing during heating of the fluid guiding pipe. This makes it possible to reduce the difference in thermal expansion between the side wall in the upper part of the housing, which is supported by the diaphragm, and the side wall in the lower part of the housing. Hence, the diaphragm is less likely to bend.

Effects of the Invention

Thus, with the pressure sensor of the present invention, the thermal buffer member having the predetermined heat capacity is disposed on the inlet pipe. Therefore, even when the rapid temperature increase occurs in the fluid guiding pipe, it is possible to prevent a rapid temperature increase in the lower part of the housing and a local thermal expansion associated with the rapid temperature increase. Accordingly, the temperature of the whole housing can be increased more uniformly, namely, with less deviation of the temperature distribution. This makes it possible to reduce the difference in thermal expansion between the upper and lower parts of the housing, thereby ensuring that the diaphragm is less likely to bend in association with the rapid temperature change of the fluid guiding pipe.

DESCRIPTION OF THE EMBODIMENTS

Figure 1:
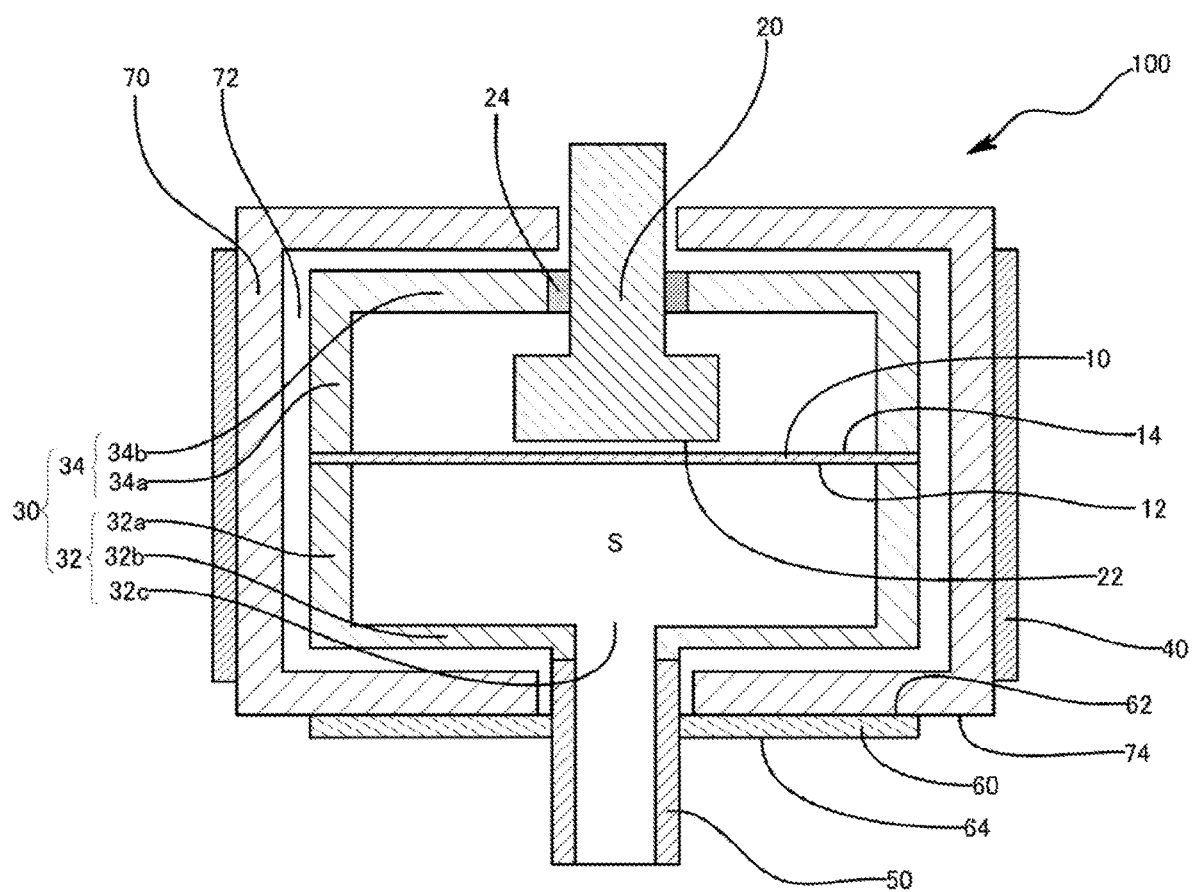
FIG. 1 is a schematic sectional view illustrating a configuration of a pressure sensor in an embodiment of the present invention.

An embodiment of a pressure sensor according to the present invention is described below with reference to the drawings. The pressure sensor described below is intended to embody a technical idea of the present invention, and the present invention is not limited to the following embodiment unless otherwise noted. Contents described in the embodiment are applicable to other embodiments. In some cases dimensions members and their positional relationship illustrated in the drawings are magnified for the sake of clarity.

The pressure sensor 100 of the present embodiment is a capacitance diaphragm gauge corresponding to an absolute pressure measurement type of total pressure vacuum gauge. The pressure sensor 100 is configured to measure a pressure by detecting a displacement of capacitance between a diaphragm that displaces under pressure, and a fixed electrode, and then by converting the displacement to a pressure. A measured target fluid is guided into a measuring chamber S in the pressure sensor 100 by coupling a fluid guiding pipe configured to guide the measured target fluid, to the pressure sensor 100 during use.

Specifically, as illustrated in FIG. 1, the pressure sensor 100 includes the diaphragm 10 that deforms under a pressure of the measured target fluid, the electrode body 20 disposed with a gap provided against the diaphragm 10, a housing 30 configured to form a measuring chamber S by being supported (or joined) onto the diaphragm 10, an inlet pipe 50 coupled to the housing 30 and configured to guide the measured target fluid into the measuring chamber S, and a thermal buffer member 60 attached to the inlet pipe 50.

These components are described below.

The diaphragm 10 constitutes a capacitor together with an electrode surface 22 that is one end surface of the electrode body 20.

As illustrated in FIG. 1, the diaphragm 10 includes a pressure receiving surface 12 configured to come into contact with the measured target fluid being guided into the measuring chamber S and receive a pressure of the measured target fluid. A rear surface 14 of the pressure receiving surface 12 is facing the electrode surface 22 of the electrode body 20 with a gap formed against the electrode surface 22.

The pressure receiving surface 12 of the diaphragm 10 in the present embodiment has an approximately disk shape under no pressure of the measured target fluid. With this configuration, when the pressure receiving surface 12 receives the pressure of the measured target fluid, the diaphragm 10 can bend uniformly irrespective of a direction from the center of the diaphragm 10, thereby making it possible to measure the pressure of the measured target fluid with higher accuracy.

The diaphragm 10 is a metal thin plate which is elastically deformable due to minute pressure change exerted on the pressuring receiving surface 12, and which has excellent corrosion resistance and heat resistance. The diaphragm 10 of the present embodiment is preferably made of an Ni—Co alloy which is composed mainly of nickel and cobalt and contains, for example, tungsten, molybdenum, titanium, and chrome. Alternatively, the diaphragm 10 may be made of an Ni alloy which is composed mainly of nickel and contains, for example, iron, chrome, and niobium.

The diaphragm 10 preferably has a thickness of, for example, 5 μm or more and 50 μm or less in order to improve sensitivity to a pressure change of the measured target fluid.

The electrode body 20 constitutes the capacitor together with the rear surface 14 that is one end surface of the diaphragm 10. The electrode body 20 is disposed so that the electrode surface 22 is facing the rear surface 14 of the diaphragm 10 with a predetermined gap interposed therebetween.

A lead wire (not illustrated) for detecting a change in capacitance is coupled to an upper end part of the electrode body 20 (an end part opposite to an end part constituting the electrode surface 22). The lead wire is coupled to an arithmetic circuit (not illustrated) configured to convert the change in capacitance to a pressure signal and output the pressure signal.

The housing 30 constitutes the measuring chamber S, into which the measured target fluid is guided, by surrounding the pressure receiving surface 12 of the diaphragm 10. The housing 30 also surrounds and fixes at least a part of the electrode body 20. As illustrated in FIG. 1, the housing 30 includes a first element 32 and a second element 34 disposed oppositely with the diaphragm 10 interposed therebetween.

The first element 32 constitutes the measuring chamber S, into which the measured target fluid is guided, by surrounding the pressure receiving surface 12 of the diaphragm 10.

As illustrated in FIG. 1, the first element 32 is joined onto an outer edge of the diaphragm 10 which is close to the pressure receiving surface 12. The first element 32 includes a side wall 32a joined onto an outer edge part of the diaphragm 10, a bottom wall 32b to which an inlet pipe 50 is coupled, and a fluid inlet hole 32c disposed at a center of the bottom wall 32b. A region surrounded by the side wall 32a, the bottom wall 32b, and the pressure receiving surface 12 becomes the measuring chamber S.

The first element 32 of the present embodiment is made into an approximately cylindrical shape having an axial direction in a direction perpendicular to a planar direction of the diaphragm 10, and is also made so that the side wall 32 has a uniform wall thickness. The first element 32 may be made of a single member, or made by joining a plurality of members together.

The second element 34 is disposed on the rear surface 14 of the diaphragm 10 and configured to fix the electrode body 20.

As illustrated in FIG. 1, the second element 34 is joined to the outer edge of the rear surface 14 of the diagraph 10. The second element 34 of the present embodiment is made into an approximately cylindrical shape having an axial direction in the direction perpendicular to the planar direction of the diaphragm 10. The second element 34 includes a side wall 34a joined to an outer edge part of the diaphragm 10, and an upper wall 34b onto which the electrode body 20 is joined. The electrode body 20 is disposed so as to pass through a center of the upper wall 34b. The second element 34 is joined to the electrode 20 by interposing therebetween a sealing member 24, such as a sealing glass that airtightly seals between the second element 34 and the electrode 20. The second element 34 may be made of a single member, or made by joining a plurality of members together.

The inlet pipe 50 is coupled to the fluid guiding pipe and configured to guide the measured target fluid into the measuring chamber S formed inside the first element 32.

The inlet pipe 50 is made into an approximately cylindrical shape and coupled to the fluid inlet hole 32c disposed on the bottom wall 32b of the first element 32.

The inlet pipe 50 of the present embodiment is made of a member different from the first element 32 but not limited thereto. For example, the inlet pipe 50 and the first element 32 may be an integrally formed member.

The pressure sensor 100 of the present embodiment includes a temperature control mechanism and a shell 70, which are intended to control temperature by indirectly heating the diaphragm 10 and the housing 30. The temperature control mechanism includes a heater 40 to radiate heat, a temperature sensor (not illustrated) attached to an outer surface of the shell 70, and a control circuit to control a heat capacity radiated from the heater 40 so that a temperature measured by the temperature sensor is retained at a desired target temperature.

The shell 70 is configured to uniformly radiate the heat radiated from the heater 40 to the diaphragm 10 and an outer surface of the housing 30.

The shell 70 is composed mainly of a material having excellent thermal conductivity, and is made of metal, such as Al or Cu. Consequently, the heat radiated from the heater 40 is well transferred through the interior of the shell 70 and accordingly the temperature distribution within the shell 70 has less deviation.

The shell 70 is formed so as to surround an outer circumferential surface of the diaphragm 10, the side wall 32a and the bottom wall 32b of the first element 32, and the side wall 34a and the upper wall 34b of the second element 34. With this configuration, the temperature distribution within the shell 70 has less deviation as described above. It is therefore possible to uniformly heat the diaphragm 10 and the outer surfaces of the first element 32 and the second element 34, irrespective of position, by the heat radiated from the shell 70. Accordingly, temperatures of the diaphragm 10, the first element 32, and the second element 34 can be increased more uniformly, namely, with lesser deviation of temperature distribution, thereby further reducing the bending of the diaphragm 10 due to the difference in thermal expansion.

The pressure sensor 100 of the present embodiment includes a space 72 for diffusing heat, which is disposed between the shell 70, and the diaphragm 10 and the housing 30. Because there exists the space 72, the heat radiated from the shell 70 is diffused over the space 72. Therefore, when compared with the case of not including the space 72, the temperatures of the diaphragm 10, the first element 32, and the second element 34 can be increased more uniformly, namely, with lesser deviation of temperature distribution. This contributes to further reducing the bending of the diaphragm 10 due to the difference in thermal expansion.

Alternatively, the space 72 may include therein a material with excellent thermal diffusivity (for example, ceramic, carbon, or the like).

The heater 40 is intended to heat the diaphragm 10 and the housing 30 with the shell 70 and the space 72 interposed therebetween. This makes it possible to prevent attachment of contaminant to the inside of the measuring chamber S, namely, the pressure receiving surface 12 of the diaphragm 10 and an inner wall of the first element 32.

A part or the whole of the heater 40 is configured to be thermally coupled to the shell 70. The heater 40 of the present embodiment is configured to contactedly surround an outer circumferential surface of the shell 70.

The thermal buffer member 60 has a predetermined heat capacity and is configured to control a temperature increase (or decrease) rate of the inlet pipe 50 and the housing 30. Because the thermal buffer member 60 is disposed so as to be thermally contacted with the inlet pipe 50, at least part of heat transferred from the fluid guiding pipe to the inlet pipe 50 is consumed to increase the temperature of the thermal buffer member 60. Therefore, even when the fluid guiding pipe is heated to cause a rapid increase in temperature, a rapid temperature increase is less likely to occur in the inlet pipe 50 and the lower part of the housing 30 (particularly, the first element 32).

The thermal buffer member 60 of the present embodiment is disposed on an outer circumferential surface of the inlet pipe 50. More specifically, the thermal buffer member 60 has a disk shape having an upper surface 62 and a lower surface 64, and is disposed so that an axial line of the thermal buffer member 60 coincides with an axial line of the inlet pipe 50. With this embodiment, the heat transferred from the heated fluid guiding pipe can be more uniformly transferred to the thermal buffer member 60 in a circumferential direction of the inlet pipe 50. Consequently, a heat capacity transferred from the inlet pipe 50 can be made more uniform in the circumferential direction in the first element 32 to which the inlet pipe 50 is coupled. It is therefore possible to further reduce the deviation of temperature distribution in the circumferential direction, thereby further reducing the bending of the diaphragm due to the difference in thermal expansion.

The thermal buffer member 60 of the present embodiment is thermally coupled to the shell 70. More specifically, the thermal buffer member 60 is disposed so that the whole upper surface 62 is in contact with a lower surface 74 of the shell 70 as illustrated in FIG. 1. With this configuration, the heat from the heated fluid guiding pipe can be transferred through the thermal buffer member 60 to the shell 70. In other words, it is possible to further reduce a heat capacity transferred from the fluid guiding pipe via the inlet pipe 50 to the first element 32. Accordingly, a rapid temperature change is much less likely to occur in the lower part of the first element 32. Furthermore, the heat transferred from the thermal buffer member 60 to the shell 70 is diffused over the space 72 inside the shell 70 and then transferred to the first element 32, thus leading to a more uniform temperature increase in the whole first element 32. Consequently, the temperature of the whole first element 32 can be increased more uniformly, namely, with less deviation of temperature distribution, thereby further reducing the bending of the diaphragm 10 due to the difference in thermal expansion between the upper and lower parts of the first element 32.

Effects of Present Embodiment

With the pressure sensor 100 of the present embodiment thus configured, the thermal buffer member 60 having the predetermined heat capacity is attached to the inlet pipe 50. Therefore, even when the fluid guiding pipe (not illustrated) is rapidly heated by the heater, at least part of the heat thereof is consumed to increase the temperature of the thermal buffer member 60 disposed on the inlet pipe 50. Hence, the temperature of the inlet pipe 50 and the temperature of the lower part of the housing 30 coupled to the inlet pipe 50 increase moderately without a rapid increase. During the time that the temperature of the inlet pipe 50 and the temperature of the lower part of the housing 30 increase moderately for a long time, the heat from the fluid guiding pipe is transferred inside the housing 30, thus leading to an increase in temperature of the upper part of the housing 30 to which the diaphragm 10 is coupled. Because the thermal buffer member 60 having the predetermined heat capacity is disposed on the inlet pipe 50, even when the fluid guiding pipe is rapidly heated by the heater, the temperature of the whole housing 30 can be increased moderately while preventing only the lower part of the housing 30 from being subjected to the rapid temperature increase. In other words, by disposing the thermal buffer member 60 on the inlet pipe 50, the thermal buffer member 60 functions as a temperature control mechanism, thereby reducing the deviation of the temperature distribution within the housing 30 during heating of the fluid guiding pipe. This makes it possible to reduce the difference in thermal expansion between the upper part of the housing 30, which supports (or is joined onto) the diaphragm 10, and the lower part of the housing 30. Hence, the diaphragm 10 is less likely to bend.

Modified Embodiments

The present invention is not limited to the foregoing embodiment. Pressure sensors in modified embodiments are described below with a focus on components different from those in the foregoing embodiment. Unless otherwise noted, elements of the pressure sensor 100 in the following embodiment may have the same configurations as the corresponding elements in the foregoing embodiment.

Figure 2:
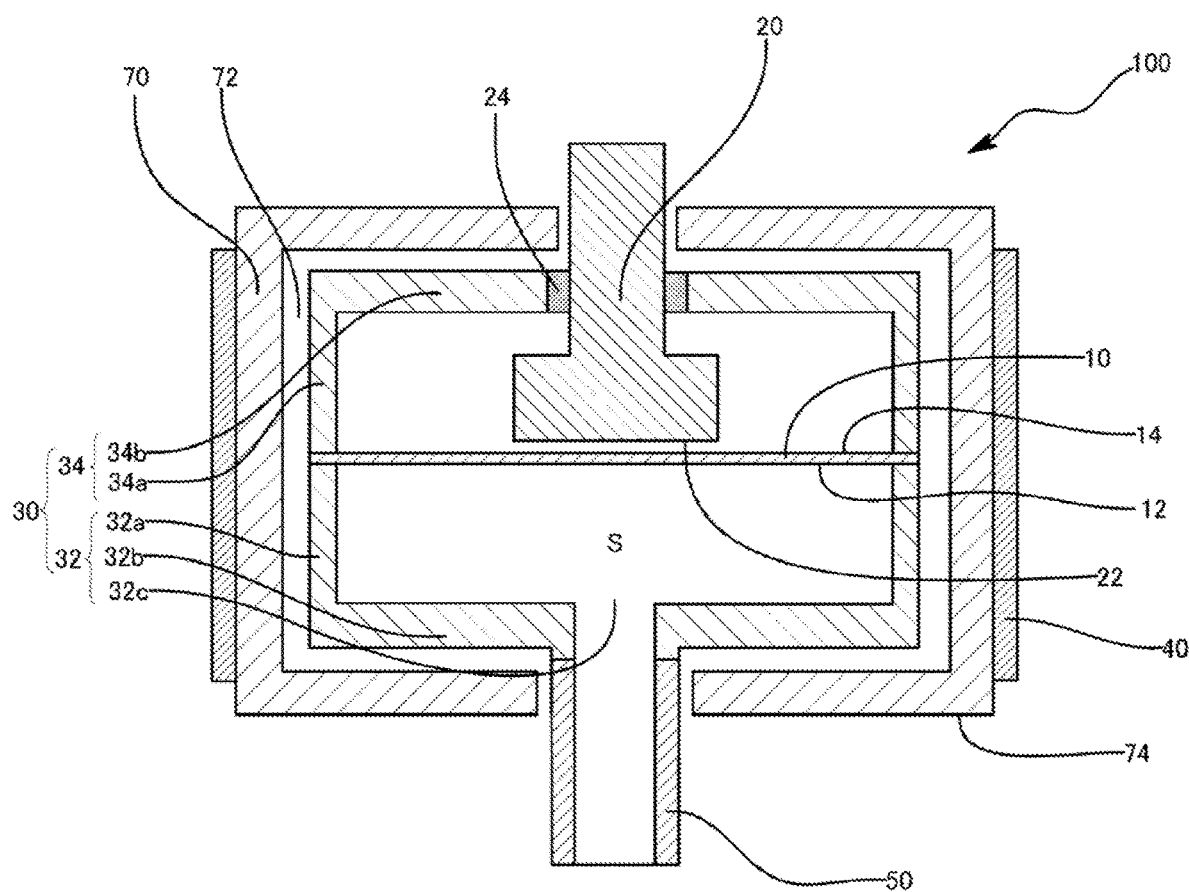
FIG. 2 is a schematic sectional view illustrating a configuration of a pressure sensor in another embodiment of the present invention.

For example, the pressure sensor 100 of the foregoing embodiment includes the thermal buffer member 60 having the predetermined heat capacity which is disposed on the inlet pipe 50. As illustrate in FIG. 2, in a modified embodiment, the thermal buffer member 60 is not disposed on the inlet pipe 50, and a wall thickness of a part or the whole of the bottom wall 32b of the first element 32 may be made thicker than a wall thickness of the side wall 32a. With this configuration, it is possible to increase a heat capacity of the bottom wall 32b of the first element 32 to which the inlet pipe 50 is coupled. Therefore, even when the fluid guiding pipe is rapidly heated by the heater, the heat thereof is firstly consumed to increase the temperature of the bottom wall 32b of the first element 32, so that the temperature of the side wall 34 in the lower part of the first element 32 increases moderately without a rapid increase. During the time that the temperature of the side wall 34 in the lower part of the first element 32 increases moderately for a long time, the heat from the fluid guiding pipe is transferred inside the first element 32, thus leading to an increase in temperature of the side wall 32a in the upper part of the first element 32 to which the diaphragm 10 is coupled. Thus, by increasing the heat capacity of the bottom wall 32b of the first element 32, even when the fluid guiding pipe is rapidly heated by the heater, the temperature of the whole side wall 32a of the first element 32 can increase moderately while preventing only the side wall 32a in the lower part of the first element 32 from being subjected to a rapid temperature increase. In other words, by making the wall thickness of a part or the whole of the bottom wall 32b of the first element 32 greater than the wall thickness of the side wall 32a, namely, by increasing the heat capacity of the bottom wall 32b, the bottom wall 32b of the first element 32 functions as a temperature control mechanism, thereby reducing the deviation of the temperature distribution within the first element 32 during heating of the fluid guiding pipe. This makes it possible to reduce the difference in thermal expansion between the side wall 34 in the upper part of the first element 32 supported by the diaphragm 10, and the side wall 32a in the lower part of the first element 32. Hence, the diaphragm 10 is less likely to bend.

Figure 3:
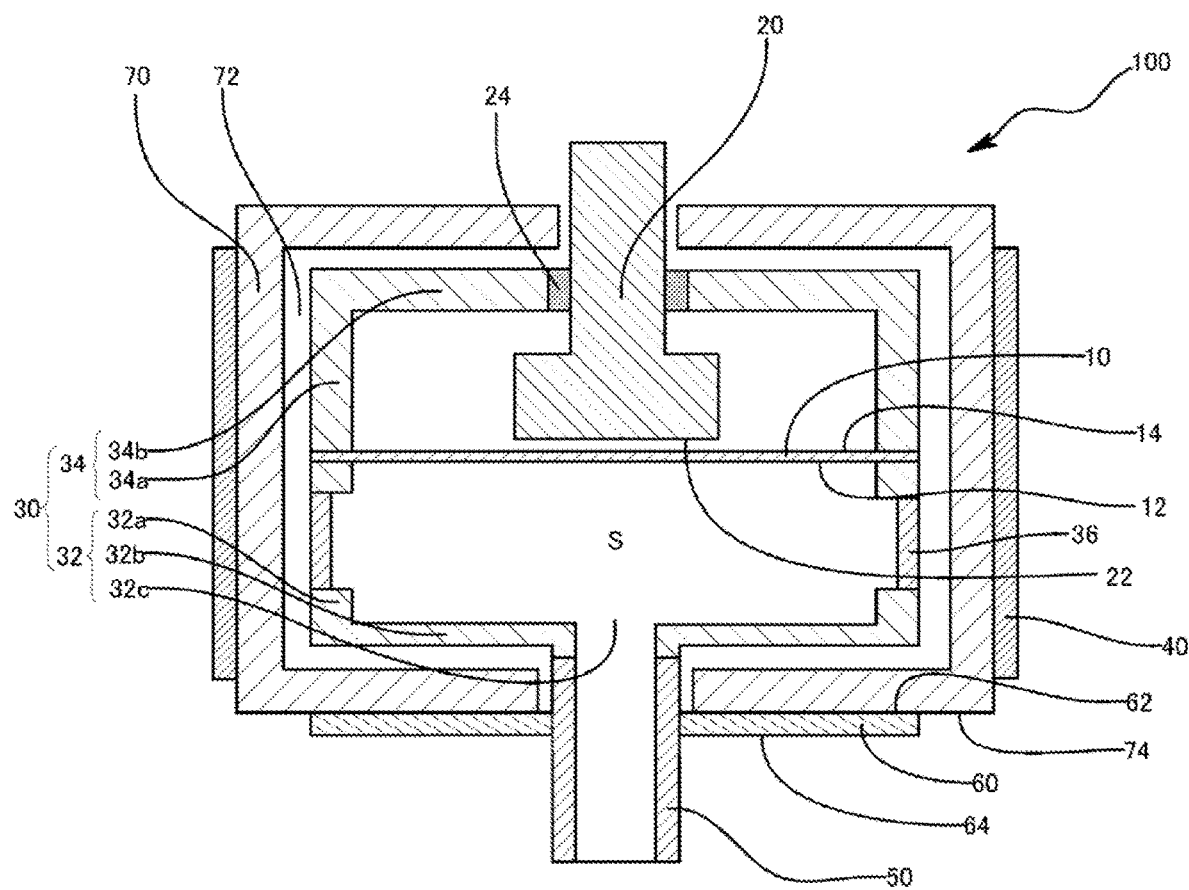
FIG. 3 is a schematic sectional view illustrating a configuration of a pressure sensor in still another embodiment of the present invention.
Figure 4:
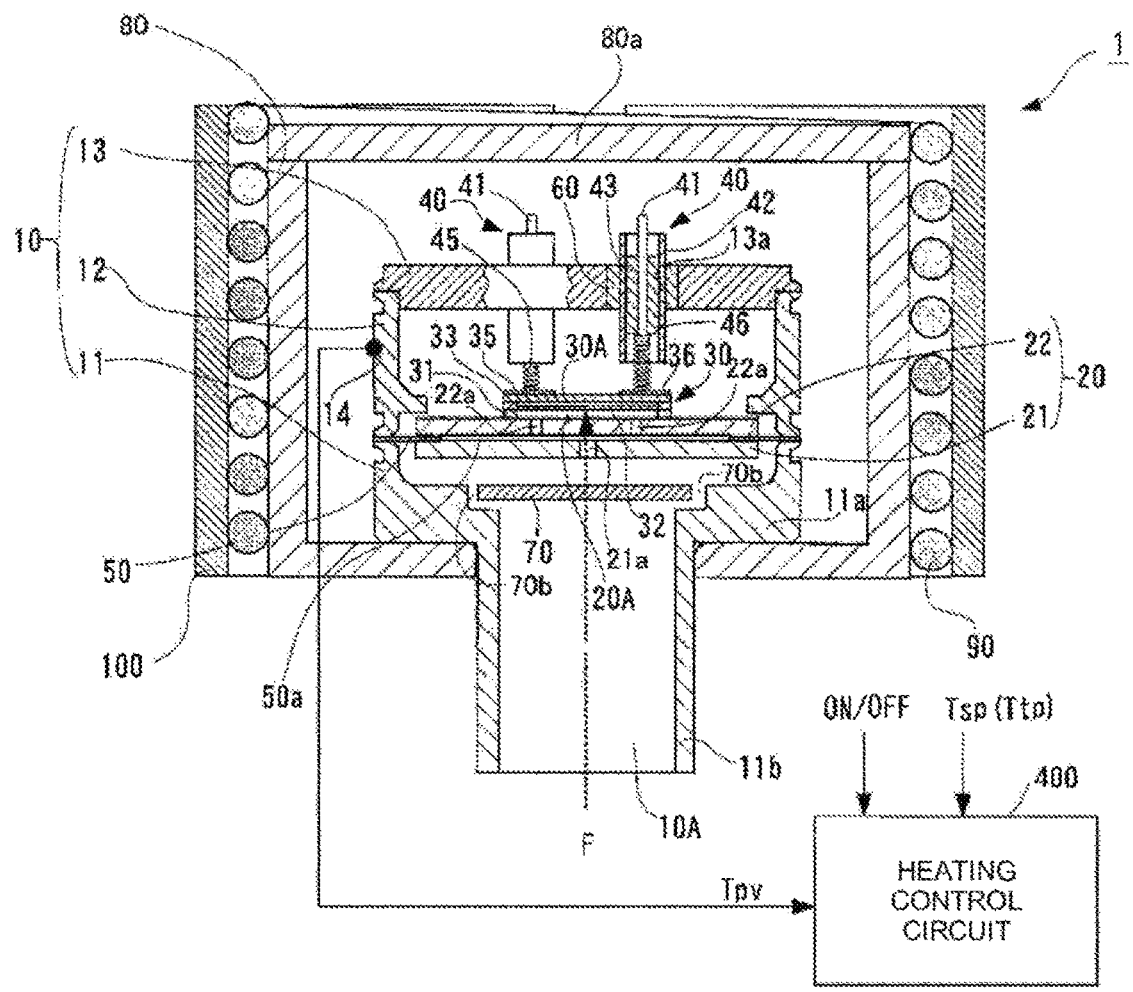
FIG. 4 is a schematic sectional view illustrating a structure of a conventional capacitive pressure sensor.

Although the wall thickness of the side wall 34 of the first element 32 is constant irrespective of a position in a height direction in the pressure sensor 100 of the foregoing embodiment, a cylindrical thin wall part 36 having a smaller thickness than other parts may be disposed at a part of the side wall 32a in another modified embodiment as illustrated in FIG. 3. With this configuration, because the thin wall part 36 having lower rigidity than other parts is disposed at the part of the side wall of the first element 32, the thin wall part 36 preferentially bends and deforms even upon occurrence of stress extending outward due to thermal expansion in the side wall 32a in the lower part of the first element 32. Accordingly, the stress extending outward, which occurs due to the thermal expansion in the side wall 32a in the lower part of the first element 32, can be mitigated by the thin wall part 36, thereby reducing stress to restore the side wall 32a toward the inside in the upper part of the first element 32. It is consequently possible to further reduce the bending of the diaphragm 10 due to the difference in thermal expansion between the upper and lower parts of the first element 32.

The first element 32 and the thin wall part 36 may be an integrally formed member. Specifically, the side wall 32a of the first element 32 may be configured to have a small thickness only in a predetermined segment in the height direction.

Alternatively, the first element 32 and the thin wall part 36 may be made up of a plurality of different members. Specifically, the first element 32 and the thin wall part 36 may be joined together by welding or the like.

The thermal buffer member 60 is in contact with the shell 70 in the pressure sensor 100 of the foregoing embodiment, but is not limited thereto. Insofar as the thermal buffer member 60 is configured to be thermally contacted with the shell 70, the heat from the inlet pipe 50 can be released through the thermal buffer member 60 to the shell 70. For example, a member, which is composed of Cu or Al and has excellent thermal conductivity, may be disposed between the thermal buffer member 60 and the shell 70, and the member may be in contact with the thermal buffer member 60 and the shell 70.

The thermal buffer member 60 is configured to be contacted with the outer surface (lower surface 74) of the shell 70 in the pressure sensor 100 of the foregoing embodiment. In still another modified embodiment, the thermal buffer member 60 may be disposed between the shell 70 and the bottom wall 32c of the first element 32 and configured to be contacted with an inner surface of the shell 70. Even with this embodiment, the heat from the heated fluid guiding pipe can be transferred through the thermal buffer member 60 to the shell 70. Therefore, a rapid temperature change is much less likely to occur in the lower part of the first element 32, and the temperature of the whole first element 32 can be increased more uniformly, namely, with less deviation of temperature distribution. It is consequently possible to further reduce the bending of the diaphragm 10 due to the difference in thermal expansion between the upper and lower parts of the first element 32.

The thermal buffer member 60 has the disk shape in the pressure sensor 100 of the foregoing embodiment, but is not limited thereto. In yet another modified embodiment, the thermal buffer member 60 may have a columnar shape, a block shape, or a rectangular shape.

Besides these, it will be understood that the present invention is not limited to the above-described embodiments, and various modifications may be made without departing from the spirit and scope of the present invention.

LIST OF REFERENCE CHARACTERS

100: pressure sensor
10: diaphragm
12: pressure receiving surface
14: rear surface
20: electrode body
22: electrode surface
24: sealing member
30: housing
32: first element
32a: side wall
32b: bottom wall
32c: fluid inlet hole
34: second element
34a: side wall
34b: upper wall
36: thin wall part
40: heater
50: inlet pipe
60: thermal buffer member
62: upper surface
64: lower surface
70: shell
72: space
74: lower surface
S: measuring chamber

What is claimed is:

1. A pressure sensor comprising:
   a diaphragm including a pressure receiving surface configured to receive a pressure of a measured target fluid;
   an electrode body including an electrode surface facing a rear surface of the pressure receiving surface with a gap interposed therebetween;
   a housing that supports the diaphragm so as to form a measuring chamber by surrounding the pressure receiving surface;
   an inlet pipe coupled to the housing and configured to guide the measured target fluid into the measuring chamber;
   a thermal buffer member being disposed on the inlet pipe and having a predetermined heat capacity;
   a shell surrounding a part or whole of the housing and the diaphragm with a space interposed therebetween; and
   a heater configured to heat the shell, wherein the thermal buffer member is thermally coupled to the shell and forms a thermal flow path between the inlet pipe and the shell.

2. The pressure sensor according to claim 1, wherein the thermal buffer member is in contact with an outer surface of the shell.

3. The pressure sensor according to claim 1, wherein the thermal buffer member is disposed on an outer circumferential surface of the inlet pipe.

4. The pressure sensor according to claim 1, wherein the thermal buffer member is integrally formed with the inlet pipe.

5. The pressure sensor according to claim 1, wherein the thermal buffer member has a disk shape and is disposed so that an axial line of the thermal buffer member coincides with an axial line of the inlet pipe.

6. The pressure sensor according to claim 1, wherein
   the housing includes a side wall and a bottom wall, and the side wall and the bottom wall together with the diaphragm are configured to form the measuring chamber, and
   the side wall has a thin wall part having a smaller thickness than other parts of the side wall and surrounding the measuring chamber.

7. A pressure sensor comprising:
   a diaphragm including a pressure receiving surface configured to receive a pressure of a measured target fluid;
   an electrode body including an electrode surface facing a rear surface of the pressure receiving surface with a gap interposed therebetween;
   a housing that supports the diaphragm so as to form a measuring chamber by surrounding the pressure receiving surface;
   an inlet pipe coupled to the housing and configured to guide the measured target fluid into the measuring chamber;
   a shell surrounding a part or whole of the housing and the diaphragm with a space interposed therebetween; and
   a heater configured to heat the shell, wherein the thermal buffer member is thermally coupled to the shell and forms a thermal flow path between the inlet pipe and the shell, wherein the housing includes a side wall and a bottom wall, and a wall thickness of a part or whole of the bottom wall is greater than a wall thickness of the side wall.

\* \* \* \* \*